United States Patent
Shimizu

(10) Patent No.: US 8,836,867 B2
(45) Date of Patent: Sep. 16, 2014

(54) VIDEO/AUDIO SIGNAL PROCESSING APPARATUS

(71) Applicant: Funai Electric Co., Ltd., Daito (JP)

(72) Inventor: Yoshiharu Shimizu, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 0 days.

(21) Appl. No.: 14/052,912

(22) Filed: Oct. 14, 2013

(65) Prior Publication Data

US 2014/0118620 A1  May 1, 2014

(30) Foreign Application Priority Data

Oct. 30, 2012  (JP) .................................. 2012-238521

(51) Int. Cl.
*H04N 5/63* (2006.01)
(52) U.S. Cl.
CPC ...................................... *H04N 5/63* (2013.01)
USPC ........................................................ 348/730
(58) Field of Classification Search
CPC ............ H04N 5/445; H04N 7/18; H04N 5/44
USPC .......... 348/730, 553, 725, 552, 554, 563–569
See application file for complete search history.

(56) References Cited

U.S. PATENT DOCUMENTS

| | | | |
|---|---|---|---|
| 6,191,814 B1* | 2/2001 | Elberbaum | 348/211.14 |
| 2008/0030624 A1* | 2/2008 | Chang | 348/730 |
| 2010/0135429 A1 | 6/2010 | Nakajima | |
| 2011/0246796 A1 | 10/2011 | Komori | |
| 2012/0050550 A1* | 3/2012 | Oba et al. | 348/207.99 |
| 2013/0057774 A1 | 3/2013 | Yoshida et al. | |

FOREIGN PATENT DOCUMENTS

| | | |
|---|---|---|
| JP | 2009-44706 A | 2/2009 |
| JP | 2010-117789 A | 5/2010 |
| JP | 2011-203781 A | 10/2011 |
| JP | 2011-229110 A | 11/2011 |
| JP | 2012-5115 A | 1/2012 |
| JP | 2012-104130 A | 5/2012 |

* cited by examiner

*Primary Examiner* — Paulos M Natnael
(74) *Attorney, Agent, or Firm* — Crowell & Moring LLP

(57) ABSTRACT

A current control portion of this video/audio signal processing apparatus is configured to set the amount of current supplied to a second external device determined by a determination portion to be smaller than the amount of current supplied to a first external device performing prescribed processing determined by the determination portion.

20 Claims, 5 Drawing Sheets

SECOND EMBODIMENT

THIRD EMBODIMENT

MODIFICATION

VIDEO/AUDIO SIGNAL PROCESSING APPARATUS

BACKGROUND OF THE INVENTION

1. Field of the Invention

The present invention relates to a video/audio signal processing apparatus, and more particularly, it relates to a video/audio signal processing apparatus including a current control portion supplying current to an external device.

2. Description of the Background Art

A video/audio signal processing apparatus including a current control portion supplying current to an external device is known in general, as disclosed in Japanese Patent Laying-Open No. 2009-044706.

Japanese Patent Laying-Open No. 2009-044706 discloses a communication system (video/audio signal processing apparatus) including a mobile device (source device) driven by a battery and a television receiver (sink device) connected to the source device through an HDMI (High-Definition Multimedia Interface) (registered trademark) cable, having a power supply portion supplying current to the source device. In this communication system, the source device transmits required information such as a current value to the sink device, and the sink device supplies required power (current) from the power supply portion to the source device on the basis of the transmitted information such as a current value.

When a plurality of source devices (external devices) are connected to the sink device in this communication system, however, the individual source devices conceivably transmit required information such as a current value to the sink device and the sink device conceivably supplies power (a relatively large amount of current) required by the source devices to the individual source devices on the basis of the transmitted information such as a current value. In this case, the sink device must disadvantageously include the power supply portion having a relatively large amount of capacity in order to supply power required by all the source devices.

SUMMARY OF THE INVENTION

The present invention has been proposed in order to solve the aforementioned problem, and an object of the present invention is to provide a video/audio signal processing apparatus supplying current to a plurality of external devices while suppressing an increase in the amount of capacity of a current control portion.

A video/audio signal processing apparatus according to an aspect of the present invention includes connection portions configured to connect a plurality of external devices, a current control portion configured to control the amount of current supplied to each of the plurality of external devices through the connection portions, and a determination portion configured to determine a first external device performing prescribed processing and a second external device other than the first external device from among the plurality of external devices, while the current control portion is configured to set the amount of current supplied to the second external device determined by the determination portion to be smaller than the amount of current supplied to the first external device determined by the determination portion.

In the video/audio signal processing apparatus according to the aspect of the present invention, as hereinabove described, the current control portion is configured to set the amount of current supplied to the second external device determined by the determination portion to be smaller than the amount of current supplied to the first external device determined by the determination portion. Thus, a large amount of current is supplied to the first external device performing the prescribed processing, requiring a relatively large amount of current, and a relatively small amount of current is supplied to the second external device other than the first external device. Therefore, current can be supplied to the plurality of external devices while an increase in the amount of capacity of the current control portion is suppressed.

In the aforementioned video/audio signal processing apparatus according to the aspect, each of the plurality of external devices preferably previously has the upper limit of the amount of current supplied from the current control portion, and the current control portion is preferably configured to set the amount of current supplied to the first external device to the upper limit that the first external device previously has and set the amount of current supplied to the second external device to be smaller than the upper limit that the first external device previously has and be smaller than the upper limit that the second external device previously has. According to this structure, the amount of current supplied to the first external device is set to the upper limit that the first external device previously has so that a large amount of current is supplied to the first external device requiring a relatively large amount of current, and the amount of current smaller than the upper limit is supplied to the second external device, whereby current can be easily supplied to the external devices while an increase in the amount of capacity of the current control portion is suppressed.

In this case, the determination portion is preferably configured to acquire the upper limit of the amount of current of each of the plurality of external devices when the plurality of external devices are connected to the connection portions. According to this structure, even in the case where the external device in processing is switched to another external device, the amount of current supplied to the external devices can be easily switched on the basis of the upper limits of the amount of current acquired when the external devices are connected to the connection portions.

In the case where the determination portion is configured to acquire the upper limit of the amount of current of each of the plurality of external devices when the plurality of external devices are connected to the connection portions, the determination portion is preferably provided with a storage portion storing the upper limit of the amount of current supplied from the current control portion that each of the plurality of external devices previously has, and the current control portion is preferably configured to set the amount of current supplied to the first external device to the upper limit of the amount of current of the first external device stored in the storage portion and set the amount of current supplied to the second external device to be smaller than the upper limit of the amount of current of the first external device stored in the storage portion and be smaller than the upper limit of the amount of current of the second external device stored in the storage portion. According to this structure, the upper limits of the amount of current of the plurality of external devices may not be acquired more than once on the basis of the upper limits of the amount of current stored in the storage portion when the plurality of external devices are connected to the connection portions.

In the case where the determination portion is configured to acquire the upper limit of the amount of current of each of the plurality of external devices when the plurality of external devices are connected to the connection portions, the upper limit of the amount of current is preferably set by the user's operation. According to this structure, the upper limits corresponding to the amount of capacity of the current control portion can be easily set by the user's operation.

In the aforementioned video/audio signal processing apparatus according to the aspect, the prescribed processing determined by the determination portion preferably includes processing of transmitting video/audio signals from the external devices to the video/audio signal processing apparatus. According to this structure, the external device performing the prescribed processing and the external device other than that can be easily determined.

In the aforementioned video/audio signal processing apparatus according to the aspect, the external devices and the connection portions are preferably connected to each other on the basis of a prescribed standard configured to transmit video/audio signals and power and perform bidirectional communication between the external devices and the connection portions. According to this structure, power can be easily supplied to the external devices while the video/audio signals are received from the external devices, and furthermore the external devices can be controlled.

In this case, according to the prescribed standard, the lower limit of the amount of current supplied from the current control portion is preferably previously set, and the current control portion is preferably configured to set the amount of current supplied to the second external device to the lower limit previously set according to the prescribed standard. According to this structure, a sufficient amount of current can be supplied to the first external device while a minimum amount of current necessary to operate the second external device is supplied to the second external device.

In the aforementioned video/audio signal processing apparatus in which the external devices and the connection portions are connected to each other on the basis of the prescribed standard configured to perform bidirectional communication between the external devices and the connection portions, according to the prescribed standard, the lower limit of the amount of current supplied from the current control portion is preferably previously set, and the current control portion is preferably configured to set the amount of current supplied to the second external device to a value set by the user's operation, equal to or more than the lower limit previously set according to the prescribed standard. According to this structure, the lower limit of the amount of current can be increased to the amount of current supplied from the current control portion appropriate for the user's need by the user's operation.

In the aforementioned video/audio signal processing apparatus in which the external devices and the connection portions are connected to each other on the basis of the prescribed standard configured to perform bidirectional communication between the external devices and the connection portions, the prescribed standard preferably includes an MHL (Mobile High-Definition Link) standard. According to this structure, according to the MHL standard, the lower limit of the amount of current supplied from the current control portion is previously set, and hence a sufficient amount of current can be supplied to the first external device while a minimum amount of current necessary to operate the second external device is supplied to the second external device.

In the aforementioned video/audio signal processing apparatus according to the aspect, the current control portion is preferably configured to charge the external devices by supplying current to the external devices and to reduce the amount of current supplied to the first external device when charge of the first external device is completed. According to this structure, the amount of current supplied to the first external device is reduced when the charge is completed, and hence power consumption of the video/audio signal processing apparatus can be suppressed.

In the aforementioned video/audio signal processing apparatus according to the aspect, the current control portion is preferably configured to charge the external devices by supplying current to the external devices, the video/audio signal processing apparatus preferably further includes an informing portion configured to inform a user of the states of charge of the external devices, and the informing portion is preferably configured to inform the user of the states of charge of the external devices during the prescribed processing of the external devices. According to this structure, even during the processing of the external devices, the user can easily confirm the states of charge of the external devices.

In the aforementioned video/audio signal processing apparatus according to the aspect, the current control portion is preferably configured to charge the external devices by supplying current to the external devices, the video/audio signal processing apparatus preferably further includes an informing portion configured to inform a user of the states of charge of the external devices, and the informing portion is preferably configured to inform the user of completion of charge of the external devices on the basis of signals indicating the completion of charge transmitted from the external devices during the prescribed processing of the external devices. According to this structure, even during the processing of the external devices, the user can be easily informed of the completion of charge of the external devices.

The aforementioned video/audio signal processing apparatus further including the informing portion configured to inform the user of the states of charge of the external devices preferably further includes a display portion configured to display a picture, and the display portion is preferably configured to be also used as the informing portion configured to inform the user of the states of charge of the external devices. According to this structure, the structure of the video/audio signal processing apparatus can be simplified, unlike the case where the informing portion and the display portion are provided separately.

In this case, the informing portion is preferably configured to inform the user of the states of charge of the external devices by displaying the states of charge of the external devices on the display portion while the display portion displays a picture transmitted from the first external device performing the prescribed processing. According to this structure, the user can view both the states of charge of the external devices and the picture transmitted from the external device.

In this case, the informing portion is preferably configured to inform the user of the states of charge of the external devices by displaying the states of charge of the external devices on the display portion while the display portion displays pictures transmitted from a plurality of first external devices performing the prescribed processing. According to this structure, the user can view both the states of charge of the external devices and the pictures transmitted from the plurality of external devices.

In the aforementioned video/audio signal processing apparatus further including the informing portion configured to inform the user of the states of charge of the external devices, the informing portion preferably includes a light emitting device. According to this structure, the user can visually confirm the states of charge of the external devices by viewing the light emitting device, and hence the user can easily confirm the states of charge of the external devices.

The aforementioned video/audio signal processing apparatus according to the aspect preferably further includes a display portion configured to display a picture, and the display portion is preferably configured to display a screen configured to receive a user input of at least one of the upper limit and the lower limit of the amount of current supplied to each of the plurality of external devices. According to this structure, the user can input at least one of the upper limits and the lower limits of the amount of current while viewing the screen displayed on the display portion, and hence the user can easily set the upper limits and the lower limits of the amount of current.

In the aforementioned video/audio signal processing apparatus according to the aspect, the current control portion is preferably configured to perform control of preventing the first external device performing the prescribed processing from performing the prescribed processing and causing the second external device not performing the prescribed processing to perform the prescribed processing on the basis of the user's operation and to perform control of reducing the amount of current of the first external device prevented from performing the prescribed processing and increasing the amount of current of the second external device caused to perform the prescribed processing. According to this structure, the external device performing the prescribed processing can be switched, and an increase in the amount of capacity of the current control portion can be suppressed.

In this case, the current control portion is preferably configured to perform control of causing the second external device not performing the prescribed processing to perform the prescribed processing after preventing the first external device performing the prescribed processing from performing the prescribed processing on the basis of the user's operation and to perform control of increasing the amount of current of the second external device caused to perform the prescribed processing after reducing the amount of current of the first external device prevented from performing the prescribed processing. According to this structure, the amount of current of the second external device caused to perform the prescribed processing is increased after the amount of current of the first external device prevented from performing the prescribed processing is reduced, and hence a state where both the amount of current of the first external device and the amount of current of the second external device are increased can be suppressed. Consequently, an increase in the amount of capacity of the current control portion can be reliably suppressed.

According to the present invention, as hereinabove described, current can be supplied to the plurality of external devices while an increase in the amount of capacity of the current control portion is suppressed.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention are hereinafter described with reference to the drawings.

(First Embodiment)

The structure of a television set 100 according to a first embodiment is now described with reference to FIG. 1. The television set 100 is an example of the "video/audio signal processing apparatus" in the present invention.

Figure 1:
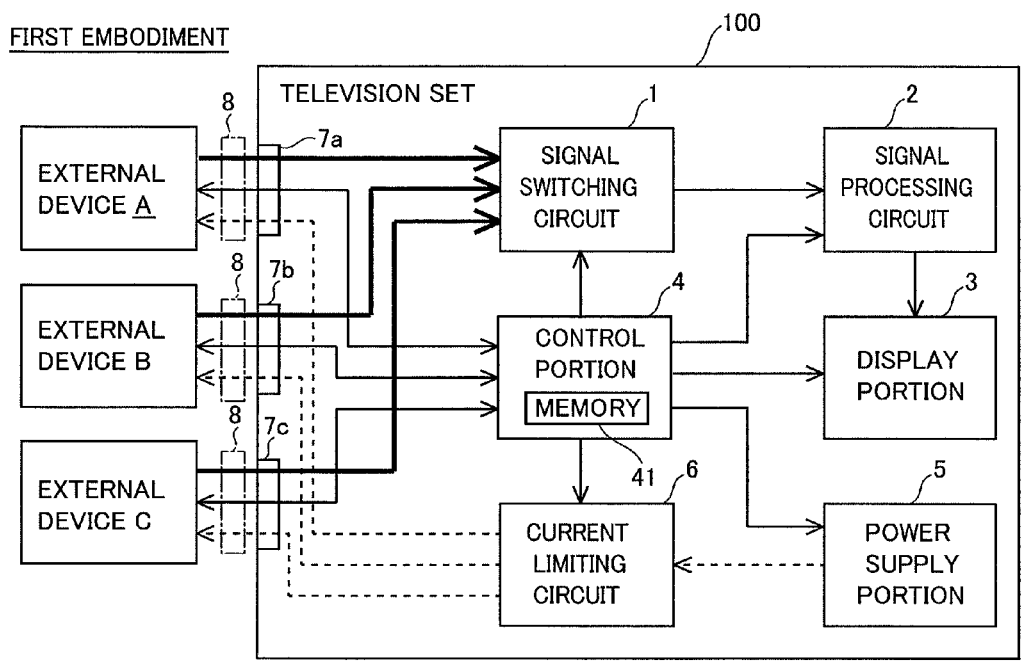
FIG. 1 is a block diagram showing the structure of a television set according to a first embodiment of the present invention.

The television set 100 includes a signal switching circuit 1, a signal processing circuit 2, a display portion 3, a control portion 4, a power supply portion 5, a current limiting circuit 6, and a plurality of (three in the first embodiment) connectors 7a, 7b, and 7c, as shown in FIG. 1. The display portion 3 is an example of the "informing portion" in the present invention. The control portion 4 is an example of the "determination portion" in the present invention. The power supply portion 5 and the current limiting circuit 6 are examples of the "current control portion" in the present invention. The connectors 7a, 7b, and 7c are examples of the "connection portions" in the present invention.

According to the first embodiment, the three connectors 7a, 7b, and 7c are connected to external devices A, B, and C through cables 8 based on the MHL (Mobile High-Definition Link) (registered trademark) standard. Furthermore, according to the first embodiment, the cables 8 are configured to transmit video/audio signals and power (current) on the basis of the MHL standard and perform bidirectional communication between the external devices A, B, and C and the control portion 4. According to the MHL standard, the video/audio signals are transmitted from the external devices A, B, and C to the television set 100 while the external devices A, B, and C are charged. The external devices A, B, and C include smart phones, STBs (set-top boxes), etc., for example. The video/audio signals (bold solid lines in FIG. 1) are input from the external devices A, B, and C into the signal switching circuit 1 through the cables 8 and the connectors 7a, 7b, and 7c. The video/audio signals are signals including at least one of video signals and audio signals. The MHL standard is an example of the "prescribed standard" in the present invention.

The signal switching circuit 1 is configured to transmit the video/audio signal transmitted from one of the external devices A, B, and C selected by the user's operation of a remote controller (not shown), for example to the signal processing circuit 2. The signal processing circuit 2 is configured to process the video/audio signal transmitted from the signal switching circuit 1 and transmit the signal to the display portion 3. The display portion 3 is configured to receive the processed video/audio signal transmitted from the signal processing circuit 2 and display (reproduce) the signal thereon.

According to the first embodiment, the power supply portion 5 is configured to supply current (dotted lines in FIG. 1) to the external devices A, B, and C through the current limiting circuit 6 to charge the external devices A, B, and C.

The control portion 4 is connected to the signal switching circuit 1, the signal processing circuit 2, the display portion 3, the power supply portion 5, and the current limiting circuit 6 and is configured to control the overall operation of the television set 100. According to the first embodiment, the control portion 4 is provided with a memory 41, as shown in FIG. 1. The memory 41 has a function of storing the upper limits (p, q, and r) of the amount of current supplied from the power supply portion 5 that the external devices A, B, and C previously have. The upper limits (p, q, and r) of the external devices A, B, and C may be equal to each other or different from each other. According to the first embodiment, from among the plurality of external devices A, B, and C, the external device (the external device A, for example) performing prescribed processing and the remaining external devices (the external devices B and C, for example) are determined. Specifically, the control portion 4 determines whether or not the external devices A, B, and C perform the prescribed processing on the basis of processing of transmitting the video/audio signals from the external devices A, B, and C to the television set 100. The control portion 4 is configured to control the current limiting circuit 6 such that the amount of current supplied to the external devices (the external devices B and C, for example) whose transmitted video/audio signals are not output from the display portion 3 (not transmitting the video/audio signals) becomes smaller than the amount of current supplied to the external device (the external device A, for example) whose transmitted video/audio signal is output from the display portion 3 (transmitting the video/audio signal). The memory 41 is an example of the "storage portion" in the present invention.

Specifically, the current limiting circuit 6 is configured to set the amount of current supplied to the external device (the external device A, for example) whose transmitted video/audio signal is output from the display portion 3 to the upper limit (p) stored in the memory 41 that the external device (external device A) previously has and set the amount of current supplied to the external devices (external devices B and C) whose transmitted video/audio signals are not output from the display portion 3 to be smaller than the upper limit (p) that the external device (external device A) previously has and be smaller than the upper limits (q and r) that the external devices (external devices B and C) previously have. The external device (the external device A, for example) transmitting the video/audio signal is an example of the "first external device" in the present invention. The external devices (the external devices B and C, for example) not transmitting the video/audio signals are examples of the "second external device" in the present invention.

According to the first embodiment, according to the MHL standard, the lower limit (s) of the amount of current supplied from the power supply portion 5 is previously set. The current limiting circuit 6 is configured to set the amount of current supplied to the external devices (the external devices B and C, for example) whose transmitted video/audio signals are not output from the display portion 3 to the lower limit (s) previously set according to the MHL standard. According to the first embodiment, the lower limit (s) is smaller than the upper limits (p, q, and r) (s <p, q, r) stored in the memory 41 that the external devices A, B, and C previously have.

Figure 2:
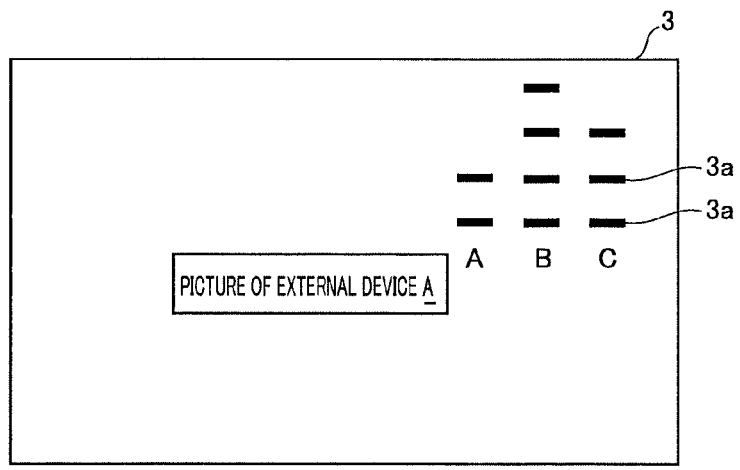
FIG. 2 is a diagram showing a display portion displaying the states of charge of external devices of the television set according to the first embodiment of the present invention.

According to the first embodiment, the display portion 3 is configured to inform (display) a user of the states of charge of the external devices A, B, and C while the video/audio signal transmitted from the external device (the external device A, for example) is output from the display portion 3. The user operates the remote controller or the like to transmit request signals for displaying the states of charge of the external devices A, B, and C to the control portion 4, whereby the states of charge of the external devices A, B, and C are displayed. Specifically, while a signal of a picture (Web, a moving image, or the like), sound, or the like reproduced by the external device A is transmitted to the display portion 3 and is displayed (reproduced) on the display portion 3, for example, the states of charge of all the external devices A, B, and C are displayed with bars 3a on the display portion 3 (in the vicinity of a corner of the display portion 3), as shown in FIG. 2. More specifically, the bars 3a corresponding in number to the states of charge (amount of charge) are displayed. FIG. 2 shows that the external device B for which four bars 3a are displayed has the largest amount of charge, the external device C for which three bars 3a are displayed has the second largest amount of charge, and the external device A for which two bars 3a are displayed has the smallest amount of charge.

Figure 3:
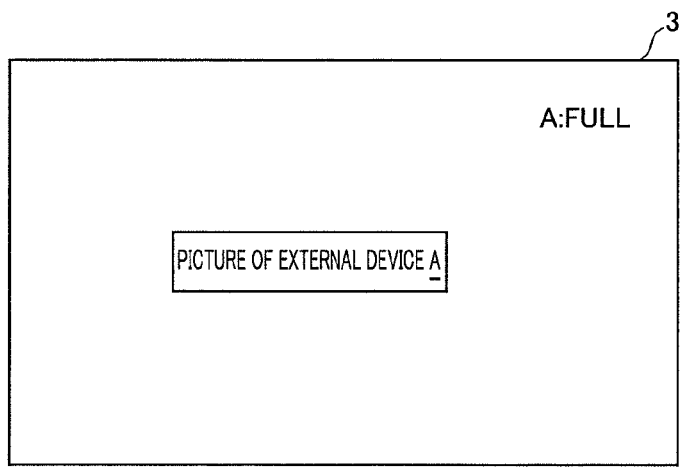
FIG. 3 is a diagram showing the display portion displaying the completion of charge of an external device of the television set according to the first embodiment of the present invention.

According to the first embodiment, the display portion 3 is configured to inform the user of the completion of charge of the external devices A, B, and C on the basis of signals indicating the completion of charge, transmitted from the external devices A, B, and C while the video/audio signal transmitted from the external device (the external device A, for example) is output from the display portion 3. Specifically, while the signal of a picture or sound reproduced by the external device A is transmitted to the display portion 3 and is displayed (reproduced) on the display portion 3, for example, the user is informed of the completion of charge of the external device A on the display portion 3 ("A: FULL" is displayed in the vicinity of the corner of the display portion 3), as shown in FIG. 3 when the signal indicating the completion of charge is transmitted from the external device A. Thus, according to the first embodiment, the display portion 3 configured to display pictures based on the video/audio signals transmitted from the external devices A, B, and C is also used as the display portion 3 (informing portion) configured to inform the user of the states of charge and completion of charge of the external devices A, B, and C.

Figure 4:
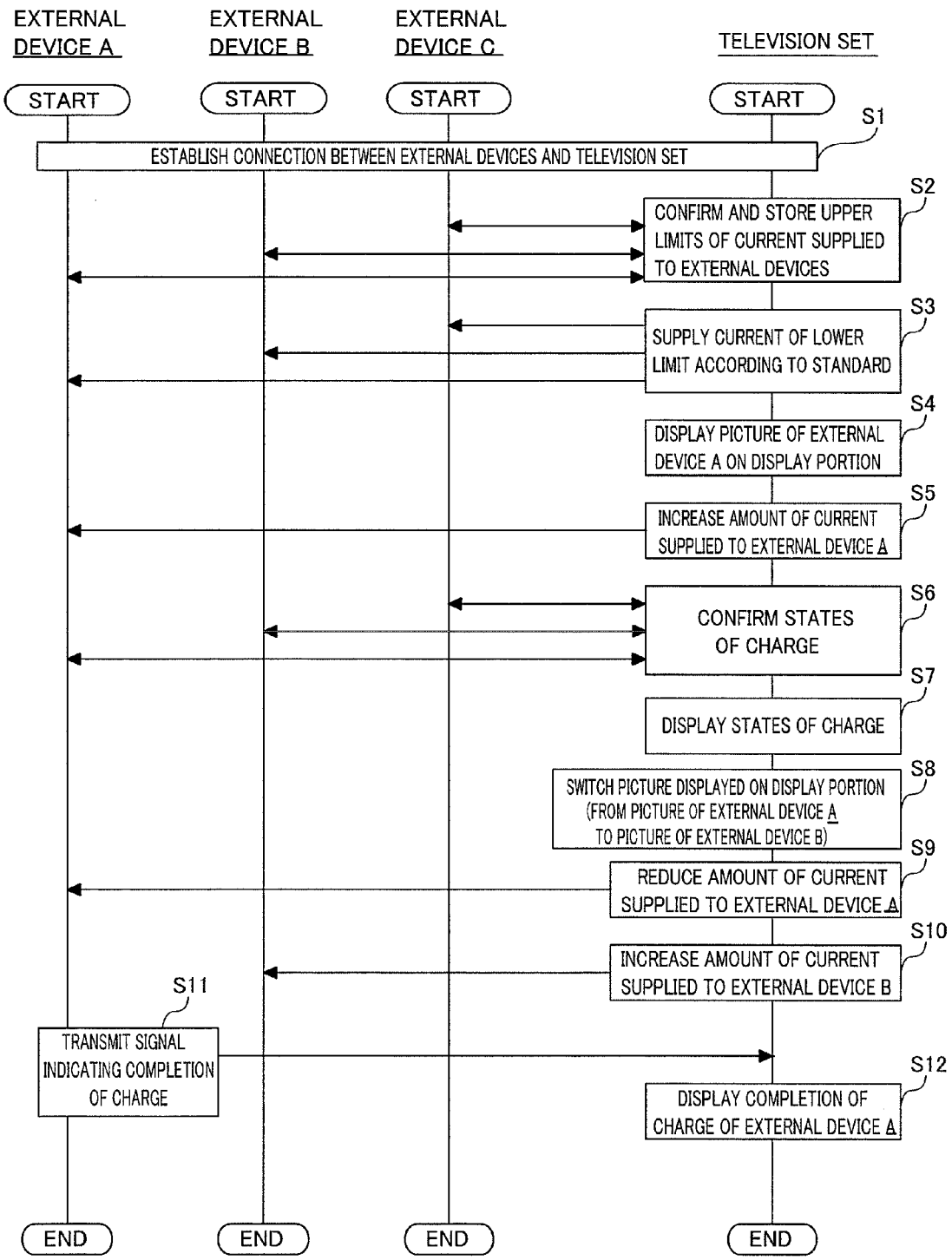
FIG. 4 is a sequence diagram for illustrating the operation of the television set according to the first embodiment of the present invention.

The operation of the television set 100 (control portion 4) according to the first embodiment is now described with reference to FIG. 4.

First, the user connects the external devices A, B, and C to the connectors 7a, 7b, and 7c of the television set 100, respectively, at a step S1. Thus, a connection (logical connection) between the television set 100 and the external devices A, B, and C is established.

Then, according to the first embodiment, the upper limits (p, q, and r) of the amount of current of the external devices A, B, and C are acquired when the external devices A, B, and C are connected to the connectors 7a, 7b, and 7c at a step S2. The acquired upper limits (p, q, and r) are stored in the memory 41 of the control portion 4.

Then, the current limiting circuit 6 is controlled by the control portion 4, whereby the amount of current of the lower limit (s) previously set according to the MHL standard is supplied to the external devices A, B, and C at a step S3.

Then, the user operates the remote controller or the like, whereby the video/audio signal (picture) transmitted from the external device A is displayed (see FIGS. 2 and 3) on the display portion 3 at a step S4. Then, the current limiting circuit 6 is controlled such that the amount of current supplied to the external device A whose transmitted video/audio signal is output from (displayed on) the display portion 3 becomes the upper limit (p) that the external device A previously has at a step S5. In other words, the current limiting circuit 6 is controlled such that the amount of current (lower limit (s)) supplied to the external devices B and C whose transmitted video/audio signals are not displayed on the display portion 3 becomes smaller than the amount of current (upper limit (p)) supplied to the external device A whose transmitted video/audio signal is displayed on the display portion 3.

Then, the user operates the remote controller or the like, whereby the request signals for displaying the states of charge of the external devices A, B, and C are transmitted to the television set 100 (control portion 4) at a step S6. Thus, the control portion 4 confirms the states of charge of the external devices A, B, and C. Then, the states of charge of the external devices A, B, and C are displayed (see FIG. 2) on the display portion 3 while the video/audio signal transmitted from the external device A is output from (displayed on) the display portion 3 at a step S7.

Then, the user operates the remote controller or the like, whereby a state where the video/audio signal (picture) transmitted from the external device A is displayed on the display portion 3 is switched to a state where the video/audio signal (picture) transmitted from the external device B is displayed on the display portion 3 at a step S8. Thus, the current limiting circuit 6 is controlled such that the amount of current supplied to the external device A whose transmitted video/audio signal is not displayed on the display portion 3 is reduced from the upper limit (p) to the lower limit (s) previously set according to the MHL standard at a step S9. At a step S10, the current limiting circuit 6 is controlled such that the amount of current supplied to the external device B whose transmitted video/audio signal is displayed on the display portion 3 is increased from the lower limit (s) to the upper limit (q) that the external device B previously has.

Then, the signal indicating the completion of charge is transmitted from the external device A to the control portion 4 at a step S11. Thus, the completion of charge of the external device A ("A: FULL", see FIG. 3) is displayed on the display portion 3 while the video/audio signal transmitted from the external device B is output from (displayed on) the display portion 3 at a step S12. The aforementioned operation of confirming and displaying the states of charge of the external devices A, B, and C, the aforementioned operation of switching the external device whose picture (sound) is displayed (reproduced) on the display portion 3, and the aforementioned operation of displaying the completion of charge of the external device are performed while the television set 100 is in an on-state.

According to the first embodiment, as hereinabove described, the current limiting circuit 6 is configured to set the amount of current supplied to the external devices (the external devices A, B and C, for example) not performing the prescribed processing determined by the control portion 4 to be smaller than the amount of current supplied to the external device (the external device A, for example) performing the prescribed processing determined by the control portion 4. Thus, a large amount of current is supplied to the external device (the external device A, for example) performing the prescribed processing (whose transmitted video/audio signal is output from the display portion 3), requiring a relatively large amount of current, and a relatively small amount of current is supplied to the remaining external devices (the external devices B and C, for example) (whose transmitted video/audio signal is not output to the display portion 3). Therefore, current can be supplied to the plurality of external devices A, B, and C while an increase in the amount of capacity of the power supply portion 5 is suppressed.

According to the first embodiment, as hereinabove described, each of the plurality of external devices A, B, and C previously has the upper limit (p, q, and r) of the amount of current supplied from the power supply portion 5, and the current limiting circuit 6 is configured to set the amount of current supplied to the external device (the external device A, for example) whose transmitted video/audio signal is output from the display portion 3 to the upper limit (p) that the external device (the external device A, for example) previously has and set the amount of current supplied to the remaining external devices (the external devices B and C, for example) to be smaller than the upper limit (p) that the external device (the external device A, for example) whose transmitted video/audio signal is output from the display portion 3 previously has. Thus, the amount of current supplied to the external device (the external device A, for example) whose transmitted video/audio signal is output from the display portion 3 is set to the upper limit (p) that the external device (the external device A, for example) previously has so that a large amount of current is supplied to the external device (the external device A, for example) requiring a relatively large amount of current, and the amount of current smaller than the upper limit (p) is supplied to the remaining external devices (the external devices B and C, for example), whereby current can be easily supplied to the external devices A, B, and C while an increase in the amount of capacity of the power supply portion 5 is suppressed.

According to the first embodiment, as hereinabove described, the control portion 4 is configured to perform control of acquiring the upper limits (p, q, and r) of the amount of current of the plurality of external devices A, B, and C when the plurality of external devices A, B, and C are connected to the connectors 7a, 7b, and 7c. Thus, even in the case where the external device (the external device A, for example) in processing (transmitting the video/audio signal output from the display portion 3) is switched to another external device (the external device B, for example), the amount of current supplied to the external devices A, B, and C can be easily switched on the basis of the upper limits (p, q, and r) of the amount of current acquired when the external devices A, B, and C are connected to the connectors 7a, 7b, and 7c.

According to the first embodiment, as hereinabove described, the control portion 4 is provided with the memory 41 storing the upper limits (p, q, and r) of the amount of current acquired when the external devices A, B, and C are connected to the connectors 7a, 7b, and 7c. Furthermore, the current limiting circuit 6 is configured to set the amount of current supplied to the external device (the external device A, for example) whose transmitted video/audio signal is output from the display portion 3 to the upper limit (p) of the external device (the external device A, for example) stored in the memory 41 and set the amount of current supplied to the remaining external devices (the external devices B and C, for example) to be smaller than the upper limit (p) of the external device (the external device A, for example) whose transmitted video/audio signal is output from the display portion 3 stored in the memory 41 and be smaller than the upper limits (q, r) of the remaining external devices (the external devices B and C, for example) stored in the memory 41. Thus, the upper limits (p, q, and r) of the amount of current of the plurality of external devices A, B, and C may not be acquired more than once on the basis of the upper limits (p, q, and r) stored in the memory 41 when the plurality of external devices A, B, and C are connected to the connectors 7a, 7b, and 7c.

According to the first embodiment, as hereinabove described, the control portion 4 is configured to determine whether or not the external devices A, B, and C perform the prescribed processing on the basis of the processing of transmitting the video/audio signal from the external devices A, B, and C to the television set 100. Thus, the external device performing the prescribed processing and the remaining external devices can be easily determined.

According to the first embodiment, as hereinabove described, the external devices A, B, and C and the connectors 7a, 7b, and 7c are connected to each other on the basis of the prescribed standard (MHL standard) configured to transmit the video/audio signal and power and perform bidirectional communication between the external devices A, B, and C and the control portion 4. Thus, power can be easily supplied to the external devices A, B, and C while the video/audio signals are received from the external devices A, B, and C, and furthermore the external devices A, B, and C can be controlled.

According to the first embodiment, as hereinabove described, according to the prescribed standard (MHL standard), the lower limit (s) of the amount of current supplied from the current limiting circuit 6 is previously set, and the current limiting circuit 6 is configured to set the amount of current supplied to the external devices (the external devices B and C, for example) whose transmitted video/audio signal is not output from the display portion 3 to the lower limit (s) previously set according to the prescribed standard. Thus, a sufficient amount of current can be supplied to the external device (the external device A, for example) whose transmitted video/audio signal is output from the display portion 3 while a minimum amount of current necessary to operate the external devices (the external devices B and C, for example) whose transmitted video/audio signal is not output from the display portion 3 is supplied to the external devices.

According to the first embodiment, as hereinabove described, the prescribed standard includes the MHL standard. Thus, according to the MHL standard, the lower limit of the amount of current supplied from the current limiting circuit 6 is previously set, and hence a sufficient amount of current can be supplied to the external device (the external device A, for example) whose transmitted video/audio signal is output from the display portion 3 while a minimum amount of current necessary to operate the external devices (the external devices B and C, for example) whose transmitted video/audio signals are not output from the display portion 3 is supplied to the external devices (the external devices B and C, for example).

According to the first embodiment, as hereinabove described, television set 100 is provided with the display portion 3 configured to inform the user of the states of charge of the external devices A, B, and C, and the display portion 3 is configured to inform the user of the states of charge of the external devices A, B, and C while the video/audio signal transmitted from the external device (the external device A, for example) is output from the display portion 3. Thus, even in a period during which the video/audio signal transmitted from the external device (the external device A, for example) is output from the display portion 3, the user can easily confirm the states of charge of the external devices A, B, and C.

According to the first embodiment, as hereinabove described, the display portion 3 is configured to inform the user of the completion of charge of the external devices A, B, and C on the basis of the signals indicating the completion of charge transmitted from the external devices A, B, and C while the video/audio signal transmitted from the external device (the external device A, for example) is output from the display portion 3. Thus, even in the period during which the video/audio signal transmitted from the external device (the external device A, for example) is output from the display portion 3, the user can be easily informed of the completion of charge of the external devices A, B, and C.

According to the first embodiment, as hereinabove described, the display portion 3 is configured to be also used as the informing portion configured to inform the user of the states of charge (completion of charge) of the external devices A, B, and C. Thus, the structure of the television set 100 can be simplified, unlike the case where the informing portion and the display portion 3 are provided separately.

According to the first embodiment, as hereinabove described, the television set 100 further includes the display portion 3 configured to display a picture, and the display portion 3 is configured to be also used as the informing portion configured to inform the states of charge (completion of charge) of the external devices A, B, and C. Thus, the structure of the television set 100 can be simplified, unlike the case where the informing portion and the display portion 3 are provided separately.

According to the first embodiment, as hereinabove described, the display portion 3 is configured to inform the user of the states of charge (completion of charge) of the external devices A, B, and C by displaying the states of charge (completion of charge) of the external devices A, B, and C on the display portion 3 while displaying the picture transmitted from the external device (the external device A, for example). Thus, the user can view both the states of charge (completion of charge) of the external devices A, B, and C and the picture transmitted from the external device (the external device A, for example).

According to the first embodiment, as hereinabove described, the current limiting circuit 6 is configured to perform control of preventing the external device (the external device A, for example) performing the processing of transmitting the video/audio signal to the television set 100 from performing the processing of transmitting the video/audio signal to the television set 100 and causing the external device (the external device B or C, for example) not performing the processing of transmitting the video/audio signal to the television set 100 to perform the processing of transmitting the video/audio signal to the television set 100 on the basis of the user's operation and to perform control of reducing the amount of current of the external device (the external device A, for example) prevented from performing the processing of transmitting the video/audio signal to the television set 100 and increasing the amount of current of the external device (the external device B or C, for example) caused to perform the processing of transmitting the video/audio signal to the television set 100. Thus, the external device performing the processing of transmitting the video/audio signal to the television set 100 can be switched, and an increase in the amount of capacity of the current limiting circuit 6 can be suppressed.

According to the first embodiment, as hereinabove described, the current limiting circuit 6 is configured to perform control of causing the external device (the external device B or C, for example) not performing the processing of transmitting the video/audio signal to the television set 100 to perform the processing of transmitting the video/audio signal to the television set 100 after preventing the external device (the external device A, for example) performing the processing of transmitting the video/audio signal to the television set 100 from performing the processing of transmitting the video/audio signal to the television set 100 on the basis of the user's operation and to perform control of increasing the amount of current of the external device (the external device B or C, for example) caused to perform the processing of transmitting the video/audio signal to the television set 100 after reducing the amount of current of the external device (the external device A, for example) prevented from performing the processing of transmitting the video/audio signal to the television set 100. Thus, the amount of current of the external device (the external device B or C, for example) caused to perform the processing of transmitting the video/audio signal to the television set 100 is increased after the amount of current of the external device (the external device A, for example) prevented from performing the processing of transmitting the video/audio signal to the television set 100 is reduced, and hence a state where both the amount of current of the external device (the external device A, for example) and the amount of current of the external device (the external device B or C, for example) are increased can be suppressed. Consequently, an increase in the amount of capacity of the current limiting circuit 6 can be reliably suppressed.

(Second Embodiment)

The structure of a television set 101 according to a second embodiment is now described with reference to FIG. 5. This television set 101 according to the second embodiment is configured such that an LED indicator 9 informs a user of the states of charge and completion of charge of external devices A, B, and C, unlike the aforementioned television set 100 according to the first embodiment configured such that the user is informed of the states of charge and completion of charge of the external devices A, B, and C on the display portion 3. The LED indicator 9 is an example of the "informing portion" or the "indicator" in the present invention. The television set 101 is an example of the "video/audio signal processing apparatus" in the present invention.

Figure 5:
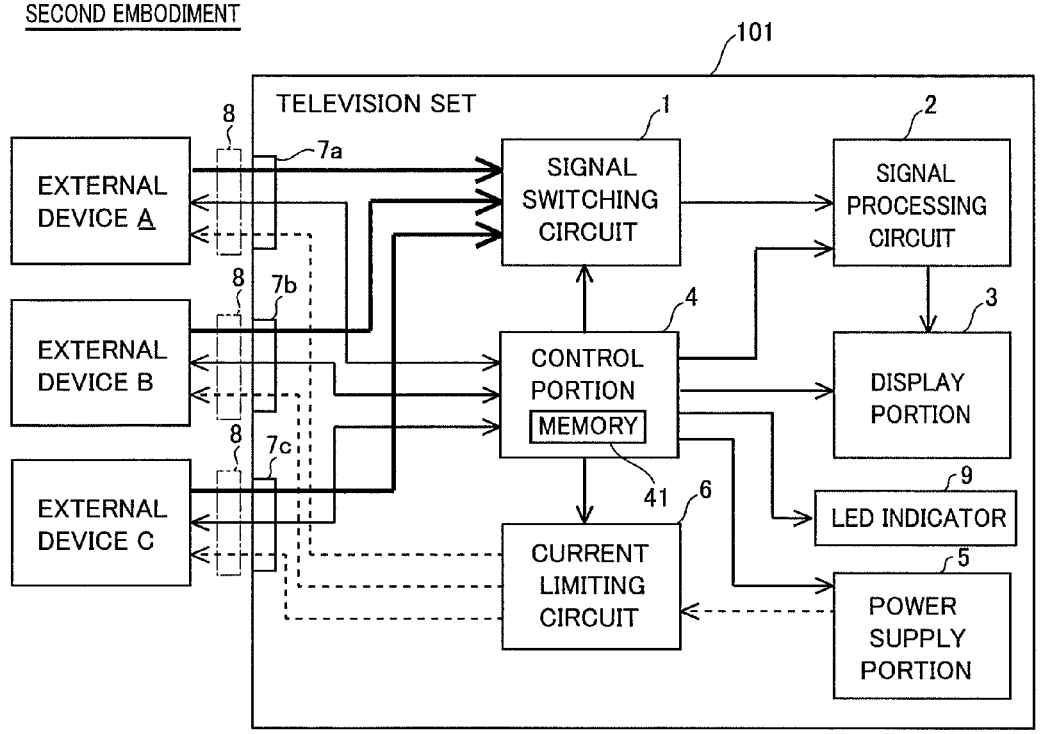
FIG. 5 is a block diagram showing the structure of a television set according to a second embodiment of the present invention.

The television set 101 includes a signal switching circuit 1, a signal processing circuit 2, a display portion 3, a control portion 4, a power supply portion 5, a current limiting circuit 6, a plurality of connectors 7a, 7b, and 7c, and the LED indicator 9, as shown in FIG. 5. The television set 101 is configured such that the LED indicator 9 informs the user of the states of charge and completion of charge of the external devices A, B, and C. The LED indicator 9 is configured to inform the states of charge by turning on LEDs corresponding in number to the amount of charge of the external devices A, B, and C, for example. The LED indicator 9 is lighted when charge of the external devices A, B, and C is completed.

The remaining structure and operation of the television set 101 according to the second embodiment are similar to those of the aforementioned television set 100 according to the first embodiment.

According to the second embodiment, as hereinabove described, the LED indicator 9 provided in the television set 101 informs the states of charge (completion of charge) of the external devices A, B, and C. Thus, the user can be informed of the states of charge and completion of charge of the external devices A, B, and C without partially hiding a picture displayed on the display portion by informing the user of the states of charge and completion of charge, unlike the case where the user is informed of the states of charge and completion of charge of the external devices A, B, and C on the display portion 3, for example.

According to the second embodiment, as hereinabove described, the LED indicator 9 includes light emitting devices (LEDs). Thus, the user can visually confirm the states of charge of the external devices A, B, and C by viewing the LED indicator 9 (light emitting devices), and hence the user can easily confirm the states of charge and completion of charge of the external devices A, B, and C.

(Third Embodiment)

Figure 6:
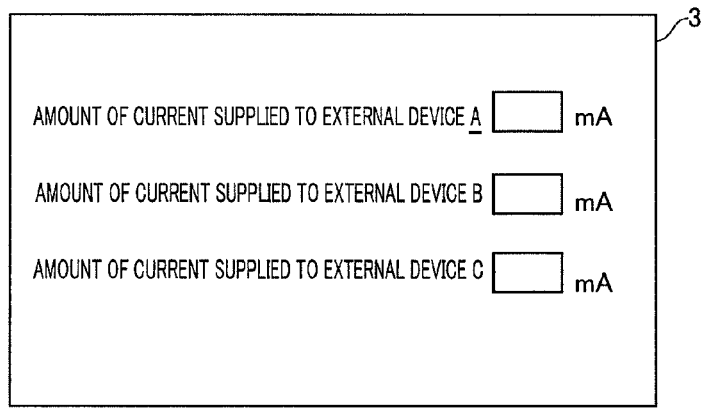
FIG. 6 is a diagram showing a screen for inputting the amount of current supplied to external devices, displayed on a display portion of a television set according to a third embodiment of the present invention.

A television set according to a third embodiment is now described with reference to FIG. 6. This television set according to the third embodiment is configured such that a user changes the amount of current (the upper limits and/or the lower limit) supplied to a plurality of external devices A, B, and C, unlike the aforementioned television sets 100 and 101 according to the first and second embodiments configured such that the amount of current supplied to the external devices A, B, and C becomes the upper limits (p, q, and r) that the external devices A, B, and C have or the lower limit (s) previously set according to the MHL standard.

The structure of the television set according to the third embodiment is similar to that of the television set 100 according to the aforementioned first embodiment shown in FIG. 1 or that of the television set 101 according to the aforementioned second embodiment shown in FIG. 5. According to the third embodiment, the television set is configured such that the amount of current supplied to the plurality of external devices A, B, and C is changed on the basis of the user's operation. Specifically, the user operates a remote controller or the like, whereby a screen for inputting the amount of current (the upper limits and/or the lower limit) supplied to the external devices A, B, and C is displayed on a display portion 3, as shown in FIG. 6. The user inputs the amount of current supplied to each of the external devices A, B, and C.

The remaining structure and operation of the television set according to the third embodiment are similar to those of the aforementioned television sets 100 and 101 according to the first and second embodiments.

According to the third embodiment, as hereinabove described, the television set is configured such that the amount of current (the upper limits and/or the lower limit) supplied to the plurality of external devices A, B, and C is changed on the basis of the user's operation. Thus, the amount of current supplied to external devices (the external devices B and C, for example) whose transmitted video/audio signal is not output from the display portion 3 is set to be larger than the amount of current (the lower limit (s) previously set according to the MHL standard, for example) originally set (the amount of current supplied to all the external devices is increased within a range not exceeding the amount of capacity of a power supply portion 5) on the basis of the user's operation, whereby the external devices (the external devices B and C, for example) whose transmitted video/audio signal is not output from the display portion 3 can be charged fast.

According to the third embodiment, as hereinabove described, according to a prescribed standard (MHL standard), the lower limit (s) of the amount of current supplied from a current limiting circuit 6 is previously set, and the current limiting circuit 6 is configured to set the amount of current supplied to the external devices (the external devices B and C, for example) whose transmitted video/audio signal is not output from the display portion 3 to a value set by the user's operation, equal to or more than the lower limit (s) previously set according to the prescribed standard (MHL standard). Thus, the lower limit of the amount of current can be increased to the amount of current supplied from the current limiting circuit 6 appropriate for the user's need by the user's operation.

According to the third embodiment, as hereinabove described, the display portion 3 is configured to display the screen configured to receive a user input of at least one of the upper limits and the lower limits of the amount of current supplied to the plurality of external devices A, B, and C. Thus, the user can input at least one of the upper limits and the lower limits of the amount of current while viewing the screen displayed on the display portion 3, and hence the user can easily set the upper limits and the lower limits of the amount of current.

The embodiments disclosed this time must be considered as illustrative in all points and not restrictive. The range of the present invention is shown not by the above description of the embodiments but by the scope of claims for patent, and all modifications within the meaning and range equivalent to the scope of claims for patent are further included.

For example, while the present invention is applied to the television set in each of the aforementioned first to third embodiments, the present invention is not restricted to this. The present invention may alternatively be applied to a BD (Blu-ray Disc) recorder or the like other than the television set, for example.

While the present invention is applied to the television set provided with the display portion configured to output the video/audio signals transmitted from the external devices in each of the aforementioned first to third embodiments, the present invention is not restricted to this. The present invention may alternatively be applied to an apparatus connected with external devices not transmitting video signals (transmitting only audio signals), reproducing only the audio signals (provided with no display portion), for example.

While the current limiting circuit is controlled to set the amount of current supplied to the external device whose transmitted video/audio signal is output from the display portion to the upper limit that the external device previously has and set the amount of current supplied to the remaining external devices to the lower limit previously set according to the MHL standard in each of the aforementioned first and second embodiments, the present invention is not restricted to this. According to the present invention, it is simply required to set the amount of current supplied to the external devices (the external devices B and C, for example) whose transmitted video/audio signals are not output from the display portion to be smaller than the amount of current supplied to the external device (the external device $\underline{A}$, for example) whose transmitted video/audio signal is output from the display portion. Furthermore, according to the present invention, the amount of current (upper limit) supplied to the external device whose transmitted video/audio signal is output from the display portion may alternatively be set by the user's operation. Furthermore, the amount of current (lower limit) supplied to the external devices whose transmitted video/audio signals are not output from the display portion may alternatively be set (within a range not falling below the lower limit previously set according to the MHL standard) by the user's operation. Thus, the upper limits and the lower limit corresponding to the amount of capacity of the current control portion can be easily set by the user's operation.

While the three external devices $\underline{A}$, B, and C are connected to the television set in each of the aforementioned first to third embodiments, the present invention is not restricted to this. A plurality other than three of external devices may alternatively be connected to the television set, for example.

While the external devices and the television set are connected to each other through the cables based on the MHL standard in each of the aforementioned first to third embodiments, the present invention is not restricted to this. According to the present invention, it is simply required to connect the external devices and the television set to each other on the basis of a standard (MyDP: Mobility DisplayPort, for example) configured to transmit the video/audio signals and power and perform bidirectional communication between the external devices and the television set (control portion).

While the amount of current supplied to external devices whose charge has been completed is not changed after the completion of charge of the external devices in each of the aforementioned first to third embodiments, the present invention is not restricted to this. For example, the current control portion may alternatively be configured to reduce the amount of current supplied to the external device (the external device to which the amount of current of the upper limit has been supplied during charging) when charge of the external device whose transmitted video/audio signal is output from the display portion is completed. Thus, the amount of current supplied to the external device whose transmitted video/audio signal is output from the display portion is reduced when the charge is completed, and hence power consumption of the television set can be suppressed.

While the video/audio signal transmitted from one external device (the external device $\underline{A}$, for example) is output to the display portion in each of the aforementioned first to third embodiments, the present invention is not restricted to this. As in a modification of the first to third embodiments shown in FIG. 7, the states of charge of the external devices $\underline{A}$, B, and C may alternatively be displayed on a display portion 3b to inform the user of the states of charge of the external devices $\underline{A}$, B, and C while pictures of video/audio signals transmitted from a plurality of (two in FIG. 7) external devices (the external devices $\underline{A}$ and B, for example) and output to the display portion 3b are displayed on the display portion 3b.

Figure 7:
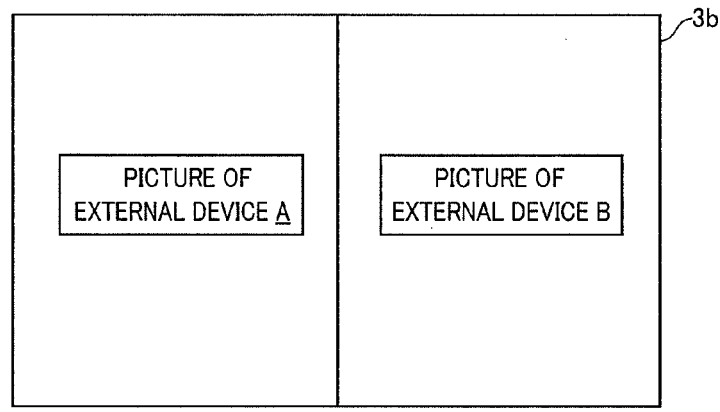
FIG. 7 is a diagram showing a state where pictures of two external devices are displayed on a display portion of a television set according to a modification of the first to third embodiments of the present invention.

In the modification of the first to third embodiments shown in FIG. 7, as hereinabove described, the display portion 3b is configured to inform the user of the states of charge of the external devices $\underline{A}$, B, and C by displaying the states of charge of the external devices $\underline{A}$, B, and C on the display portion 3b while displaying the pictures of the video/audio signals transmitted from the plurality of (two in FIG. 7) external devices (the external devices $\underline{A}$ and B, for example) and output to the display portion 3b on the display portion 3b. Thus, the user can view both the states of charge of the external devices $\underline{A}$, B, and C and the pictures transmitted from the plurality of (two in FIG. 7) external devices (the external devices $\underline{A}$ and B, for example).

While the LED indicator is employed as the indicator according to the present invention in the aforementioned second embodiment, the present invention is not restricted to this. According to the present invention, an indicator other than the LED indicator may alternatively be employed.

While the user is informed of the states of charge of the external devices with the bars (see FIG. 2) or the LED indicator (see FIG. 5) in each of the aforementioned first to third embodiments, the present invention is not restricted to this. The states of charge (amount of charge) of the external devices may alternatively be displayed as percentages (%) or the like on the display portion, for example.

What is claimed is:

1. A video/audio signal processing apparatus comprising:
    connection portions configured to connect a plurality of external devices;
    a current control portion configured to control an amount of current supplied to each of the plurality of external devices through the connection portions; and
    a determination portion configured to determine a first external device performing prescribed processing and a second external device other than the first external device from among the plurality of external devices, wherein
    the current control portion is configured to set an amount of current supplied to the second external device determined by the determination portion to be smaller than an amount of current supplied to the first external device determined by the determination portion, each of the plurality of external devices previously has an upper limit of an amount of current supplied from the current control portion, and the current control portion is configured to set the amount of current supplied to the second external device to be smaller than the upper limit that the first external device previously has and smaller than the upper limit that the second external device previously has.

2. The video/audio signal processing apparatus according to claim 1, wherein
the current control portion is configured to set the amount of current supplied to the first external device to the upper limit that the first external device previously has.

3. The video/audio signal processing apparatus according to claim 2, wherein
the determination portion is configured to acquire the upper limit of the amount of current of each of the plurality of external devices when the plurality of external devices are connected to the connection portions.

4. The video/audio signal processing apparatus according to claim 3, wherein
the determination portion is provided with a storage portion storing the upper limit of the amount of current supplied from the current control portion that each of the plurality of external devices previously has, and
the current control portion is configured to set the amount of current supplied to the first external device to the upper limit of the amount of current of the first external device stored in the storage portion and set the amount of current supplied to the second external device to be smaller than the upper limit of the amount of current of the first external device stored in the storage portion and smaller than the upper limit of the amount of current of the second external device stored in the storage portion.

5. The video/audio signal processing apparatus according to claim 2, wherein
the upper limit of the amount of current is set by a user's operation.

6. The video/audio signal processing apparatus according to claim 1, wherein
the prescribed processing determined by the determination portion comprises processing of transmitting video/audio signals from the external devices to the video/audio signal processing apparatus.

7. The video/audio signal processing apparatus according to claim 1, wherein
the external devices and the connection portions are connected to each other on the basis of a prescribed standard configured to transmit video/audio signals and power and perform bidirectional communication between the external devices and the connection portions.

8. The video/audio signal processing apparatus according to claim 7, wherein
according to the prescribed standard, a lower limit of an amount of current supplied from the current control portion is previously set, and
the current control portion is configured to set the amount of current supplied to the second external device to the lower limit previously set according to the prescribed standard.

9. The video/audio signal processing apparatus according to claim 7, wherein
according to the prescribed standard, a lower limit of an amount of current supplied from the current control portion is previously set, and the current control portion is configured to set the amount of current supplied to the second external device to a value set by a user's operation, equal to or more than the lower limit previously set according to the prescribed standard.

10. The video/audio signal processing apparatus according to claim 7, wherein
the prescribed standard comprises an MHL (Mobile High-Definition Link) standard.

11. The video/audio signal processing apparatus according to claim 1, wherein
the current control portion is configured to charge the external devices by supplying current to the external devices and to reduce the amount of current supplied to the first external device when charge of the first external device is completed.

12. The video/audio signal processing apparatus according to claim 1, wherein
the current control portion is configured to charge the external devices by supplying current to the external devices,
the video/audio signal processing apparatus further comprising an informing portion configured to inform a user of states of charge of the external devices, wherein
the informing portion is configured to inform the user of the states of charge of the external devices during the prescribed processing of the external devices.

13. The video/audio signal processing apparatus according to claim 1, wherein
the current control portion is configured to charge the external devices by supplying current to the external devices,
the video/audio signal processing apparatus further comprising an informing portion configured to inform a user of states of charge of the external devices, wherein
the informing portion is configured to inform the user of completion of charge of the external devices on the basis of signals indicating the completion of charge transmitted from the external devices during the prescribed processing of the external devices.

14. The video/audio signal processing apparatus according to claim 12, further comprising a display portion configured to display a picture, wherein
the display portion is configured to be also used as the informing portion configured to inform the user of the states of charge of the external devices.

15. The video/audio signal processing apparatus according to claim 14, wherein
the informing portion is configured to inform the user of the states of charge of the external devices by displaying the states of charge of the external devices on the display portion while the display portion displays a picture transmitted from the first external device performing the prescribed processing.

16. The video/audio signal processing apparatus according to claim 15, wherein
the informing portion is configured to inform the user of the states of charge of the external devices by displaying the states of charge of the external devices on the display portion while the display portion displays pictures transmitted from a plurality of first external devices performing the prescribed processing.

17. The video/audio signal processing apparatus according to claim 12, wherein
the informing portion includes a light emitting device.

18. The video/audio signal processing apparatus according to claim 1, further comprising a display portion configured to display a picture, wherein
the display portion is configured to display a screen configured to receive a user input of at least one of an upper limit and a lower limit of the amount of current supplied to each of the plurality of external devices.

19. The video/audio signal processing apparatus according to claim 1, wherein
the current control portion is configured to perform control of preventing the first external device performing the prescribed processing from performing the prescribed processing and causing the second external device not performing the prescribed processing to perform the prescribed processing on the basis of a user's operation and to perform control of reducing the amount of current of the first external device prevented from performing the prescribed processing and increasing the amount of current of the second external device caused to perform the prescribed processing.

20. The video/audio signal processing apparatus according to claim 19, wherein
the current control portion is configured to perform control of causing the second external device not performing the prescribed processing to perform the prescribed processing after preventing the first external device performing the prescribed processing from performing the prescribed processing on the basis of the user's operation and to perform control of increasing the amount of current of the second external device caused to perform the prescribed processing after reducing the amount of current of the first external device prevented from performing the prescribed processing.

* * * * *